United States Patent
Cunico et al.

(10) Patent No.: US 9,648,061 B2
(45) Date of Patent: May 9, 2017

(54) SENTIMENT ANALYSIS IN A VIDEO CONFERENCE

(71) Applicant: International Business Machines Corporation, Armonk, NY (US)

(72) Inventors: Hernan A. Cunico, Holly Springs, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 14/454,986

(22) Filed: Aug. 8, 2014

(65) Prior Publication Data

US 2016/0042281 A1 Feb. 11, 2016

(51) Int. Cl.
G06F 17/20 (2006.01)
H04L 29/06 (2006.01)
G06K 9/00 (2006.01)
H04N 7/00 (2011.01)
G06N 5/02 (2006.01)

(52) U.S. Cl.
CPC ........ *H04L 65/403* (2013.01); *G06K 9/00221* (2013.01); *G06N 5/022* (2013.01); *H04L 65/1096* (2013.01); *H04L 65/605* (2013.01); *H04N 7/00* (2013.01)

(58) Field of Classification Search
None
See application file for complete search history.

(56) References Cited

U.S. PATENT DOCUMENTS

| | | | |
|---|---|---|---|
| 7,705,875 B2 | 4/2010 | Shingu et al. | |
| 8,243,116 B2 | 8/2012 | Qvarfordt et al. | |
| 8,363,063 B2 | 1/2013 | Ou et al. | |
| 9,336,268 B1* | 5/2016 | Moudy | G06F 17/30412 |
| 2008/0162648 A1 | 7/2008 | Leung | |
| 2009/0079816 A1* | 3/2009 | Qvarfordt | G06K 9/00335 348/14.16 |
| 2010/0253689 A1* | 10/2010 | Dinicola | H04M 3/567 345/467 |
| 2012/0191730 A1 | 7/2012 | Parikh et al. | |
| 2012/0246054 A1 | 9/2012 | Sastri | |
| 2012/0278064 A1 | 11/2012 | Leary et al. | |
| 2013/0063542 A1* | 3/2013 | Bhat | H04N 7/15 348/14.03 |
| 2013/0169680 A1 | 7/2013 | Chien et al. | |
| 2013/0232516 A1* | 9/2013 | Paull | H04N 21/252 725/13 |
| 2013/0268262 A1 | 10/2013 | Moilanen et al. | |

(Continued)

FOREIGN PATENT DOCUMENTS

EP 2546763 A1 1/2013

OTHER PUBLICATIONS

Busso, et al., "Analysis of Emotion Recognition using Facial Expressions, Speech and Multimodal Information", ICMI'04, Oct. 13-15, 2004, pp. 205-211.

(Continued)

*Primary Examiner* — Stanley K Hill
*Assistant Examiner* — Mikayla Chubb
(74) *Attorney, Agent, or Firm* — Maeve Carpenter (57) ABSTRACT

In an approach to determine a sentiment of an attendee of a video conference, the computer receives a video of an attendee of a video conference and, then, determines, based, at least in part, on the video of the attendee, a first sentiment of the attendee.

20 Claims, 4 Drawing Sheets

(56) References Cited

U.S. PATENT DOCUMENTS

| | | |
|---|---|---|
| 2013/0297546 A1 | 11/2013 | Woods-Holder |
| 2014/0118225 A1 | 5/2014 | Jerauld |
| 2014/0149177 A1* | 5/2014 | Frank .................... G06Q 10/06 705/7.29 |
| 2014/0314310 A1* | 10/2014 | Movellan ........... G06K 9/00302 382/155 |
| 2014/0337097 A1* | 11/2014 | Farlie ................ G06Q 30/0203 705/7.32 |
| 2015/0279426 A1* | 10/2015 | Maurer ................. G11B 27/28 386/241 |
| 2015/0347903 A1* | 12/2015 | Saxena ................ G06T 11/206 706/11 |

OTHER PUBLICATIONS

U.S. Appl. No. 14/320,131, filed Jun. 30, 2014.
U.S. Appl. No. 14/320,233, filed Jun. 30, 2014.
U.S. Appl. No. 14/570,500, filed Dec. 15, 2014.

\* cited by examiner

SENTIMENT ANALYSIS IN A VIDEO CONFERENCE

BACKGROUND OF THE INVENTION

The present invention relates generally to the field of video conferencing, and more particularly to analyzing sentiment of attendees in a video conference.

Global business meetings commonly occur by video conference, connecting people across multiple continents and time zones. Video conferences enable participants to share video and audio content with each other in a real-time environment across multiple continents. Using visual and verbal communication cues provides attendees in a video conference with the ability to interact and communicate more clearly. Attendees may use facial expressions to aide verbal communication and, through face to face communication, develop relationships that aide in business endeavors and team building.

Sentiment analysis aides in the understanding of effective communication and recognition of emotions during human-computer interactions. Sentiment analysis includes polarity which considers emotional classifications such as "positive", "negative" or "neutral" text (or speech), and advanced polarity which considers more specific emotional classifications such as happy, sad, fear, disgust, surprise and anger. A developed and fairly mature technology as applied to the written word such as books, articles, and political event reports, sentiment analysis progresses to the spoken word and human speech with the advent of speech analysis programs and natural language processing. Sentiment analysis aims to determine the attitude and/or reaction of a speaker with respect to some topic or discussion in the overall context of a discussion where the attitude may be determined not just by what is said but how it is said.

Sentiment analysis integrating facial recognition algorithms and software utilizing facial expressions has been used to evaluate sentiment. Analysis of facial expressions and facial movements may determine sentiment of a subject. Sentiment analysis techniques integrating both words and facial expressions have shown promising results providing a machine or computer with an ability to understand or determine human emotions and emotional responses.

SUMMARY

According to one aspect of the present invention a method is disclosed for determining a sentiment of an attendee of a video conference. The computer receives a video of an attendee of a video conference and determines, based, at least in part, on the video of the attendee, a first sentiment of the attendee.

According to another aspect of the present invention a computer program product is disclosed for determining a sentiment of an attendee of a video conference. The computer program receives a video of an attendee of a video conference and determines, based, at least in part, on the video of the attendee, a first sentiment of the attendee.

According to yet another aspect of the present invention a system is disclosed for determining a sentiment of an attendee of a video conference. The computer system receives a video of an attendee of a video conference and determines, based, at least in part, on the video of the attendee, a first sentiment of the attendee.

DETAILED DESCRIPTION

Video conferences provide a cost effective method to allow virtual face to face meetings with global attendees to aid in effective team building, problem solving and cost effective status meetings where attendees can use both verbal and visual communication modes. Embodiments of the present invention recognize some attendees may not have access to video recording capability or may not wish to provide a real-time or live video recording, for example, due to appearance. Embodiments of the present invention recognize that in the situations where an attendee is not providing a live video feed, the video conference moderator and other attendees miss the visual cues provided by non-verbal communication in a video conference. Additionally, in video conferences with multiple attendees, it is difficult to observe each attendee's video to determine the attendee's reception of the presented material in the video conference, especially if an attendee is unknown to a presenter or a meeting moderator.

Embodiments of the present invention provide a method to determine information on a video conference attendee's sentiment or reaction to a meeting discussion by providing a sentiment analysis of the attendee based on facial recognition algorithms and facial feature recognition techniques. The sentiment analysis using facial recognition may be used in conjunction with natural language processing (NLP) and sentiment analysis of meeting discussions when the attendee participates in the meeting discussions. Real-time sentiment analysis data may be provided with live video of the attendee or may be provided in place of a video feed of the attendee in the video conference. Embodiments of the present invention provide the capability to aggregate the sentiment analysis data of each of the video conference attendees and provide real time aggregate sentiment for the video conference. Embodiments of the present invention provide the capability to evaluate and learn an attendee's characteristic expressions to more accurately determine sentiment. The sentiment data of an attendee determined during a video conference provides a real time feedback of meeting effectiveness and provides moderators and presenters with an additional indication of attendee interest or engagement in the video conference. Additionally, embodiments of the present invention may provide insight into non-verbal communication through sentiment analysis of a meeting when an attendee participates in a video conference without video capability or, for those who may be visually impaired.

Figure 1:
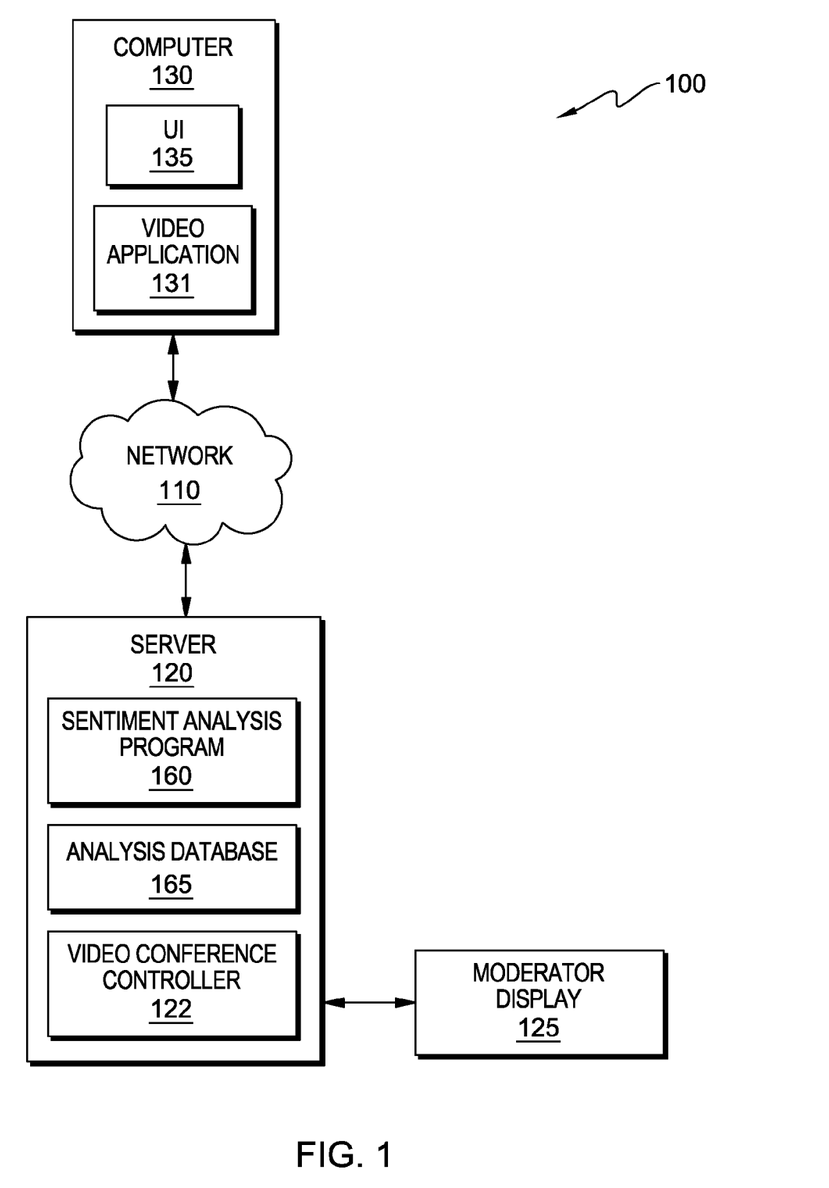
FIG. 1 is a functional block diagram illustrating a distributed data processing environment for a sentiment analysis program for video conferencing, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data processing environment 100 includes server 120, moderator display 125 and computer 130 interconnected over network 110.

In an exemplary embodiment, network 110 is the Internet representing a worldwide collection of networks and gateways that use Transmission Control Protocol/Internet Protocol (TCP/IP) protocols to communicate with one another. Network 110 may include a cable, a router, switches and/or a firewall. Server 120 and computer 130 are interconnected by network 110. Network 110 can be any combination of connections and protocols capable of supporting communications between server 120 and computer 130. Network 110 may also be implemented as a number of different types of networks, such as an intranet, a local area network (LAN), a virtual local area network (VLAN), a wide area network (WAN), or any combination of a number of different types of networks. FIG. 1 is intended as an example, and not as an architectural limitation for the different embodiments.

Server 120 may be a web server, a server computer such as a management server, or any other electronic device or computing system capable of sending and receiving data. In another embodiment, server 120 represents a "cloud" of computers interconnected by one or more networks, where server 120 is a computing system utilizing clustered computers and components to act as a single pool of seamless resources when accessed through network 110. Server 120 includes sentiment analysis program 160, analysis database 165 and video conference controller 122 which can receive video from computer 130. Server 120 can include moderator display 125. In an embodiment, moderator display 125 may be connected to server 120 via network 110. In other embodiments, moderator display 125 may be included on another computing device within distributed data processing environment 100 (not shown), with access to server 120 via network 110. Video conference controller 122 on server 120 sends, by a wire connection or wirelessly, a video of a video conference attendee using computer 130. An attendee is a person using an electronic device such as a smart phone, a tablet, a cell phone or a notebook, for example, to connect to a video conference. In the exemplary embodiment, the attendee connects to a video conference with both video and audio capability and the video is representative of the attendee's real-time or near real-time facial features and facial movements. Video conference controller 122 on server 120 can use known video or web conferencing technologies to display video, audio, or images on moderator display 125 and receive video, audio, or images from computer 130.

Sentiment analysis program 160 analyzes video of the attendee in a video conference transmitted via network 110, which includes an attendee's spoken words and facial expressions, to determine an attendee's sentiment. Sentiment analysis program 160 sends, to analysis database 165, and to video conference controller 122, the attendee's sentiment. In an embodiment, the attendee's sentiment may be displayed on a video conference display to a group of video conference attendees. Sentiment analysis program 160 determines an individual attendee's sentiment using recognition of the attendee's facial expressions and facial movements in the real-time video received from computer 130. In addition to using facial recognition of an attendee's facial expressions and facial movement, sentiment analysis program 160 further refines the sentiment analysis using NLP and sentiment analysis of the attendee's spoken words in the video conference discussions. Sentiment analysis program 160 may determine an aggregate, real-time sentiment analysis representing the average or group sentiment of all of the attendees in the video conference analysis using sentiment analysis program 160.

Figure 3:
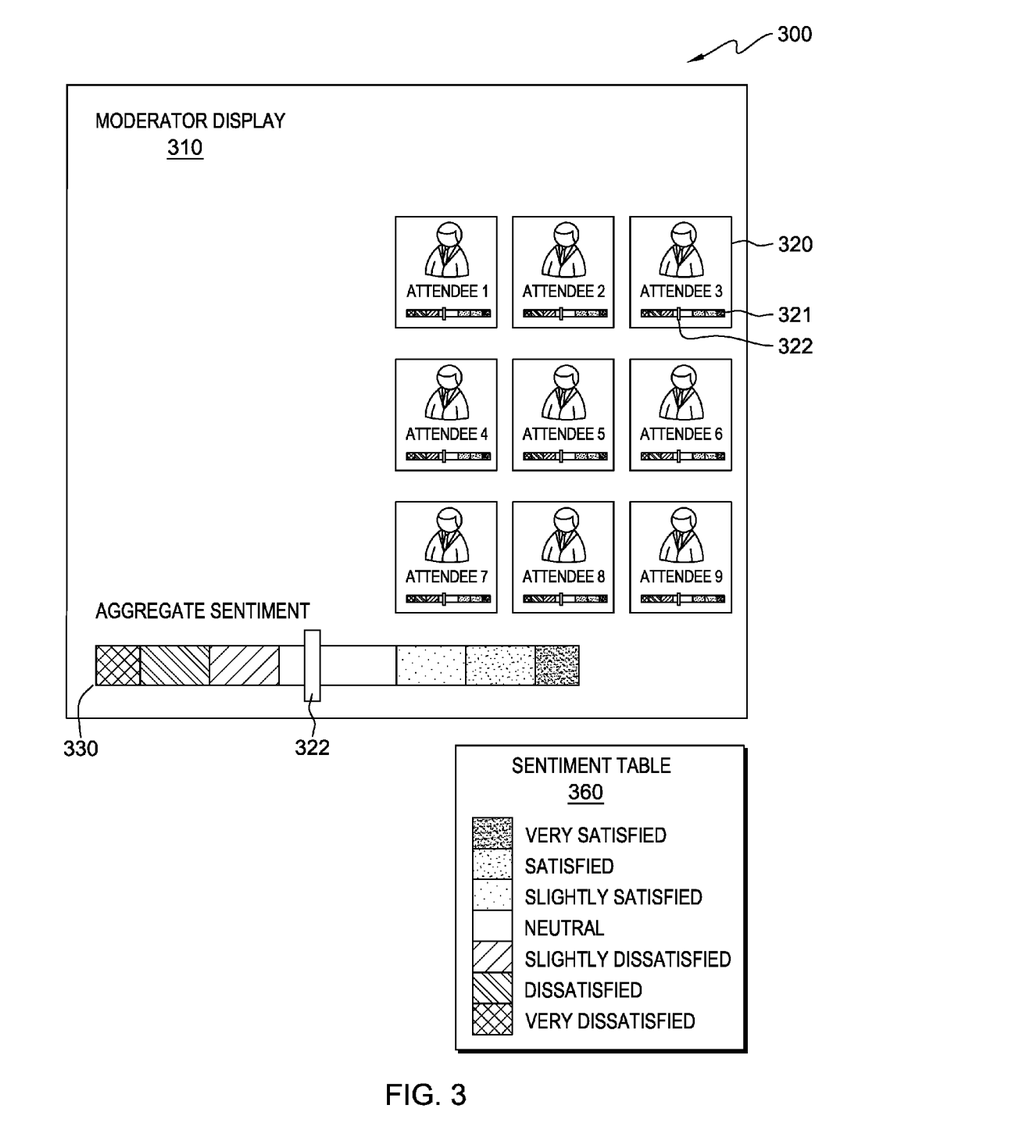
FIG. 3 is a diagram illustrating an example of a moderator display depicting a graphical representation of attendee's sentiment in a video conference.

In the exemplary embodiment, sentiment analysis program 160 provides a real-time or near real-time sentiment analysis of the attendee in the video conference to a meeting moderator for display on moderator display 125. The attendee's sentiment which may be a graphical representation of the attendee's sentiment, for example, a color coded sentiment bar with a sliding indicator to show an attendee's real-time sentiment as depicted in FIG. 3 may be displayed on moderator display 125. In addition, in an embodiment, sentiment analysis program 160 determines sentiment analysis for each of the attendees in a video conference and compiles an aggregate real-time sentiment of the video conference. The real-time aggregate sentiment representing an average sentiment for all of the video conference attendees may be displayed on moderator display 125 as a graphical representation of the aggregate real-time sentiment.

Sentiment analysis program 160 on server 120 may send a sentiment analysis via video conference controller 122 to moderator display 125. Sentiment analysis program 160 may store a sentiment analysis of the attendee in analysis database 165. Server 120 may include internal and external hardware components, as depicted and described in further detail with respect to FIG. 4.

Analysis database 165 on server 120 stores sentiment analysis of video conference attendees, including videos of the attendee in a video conference. Analysis database 165 stores sentiment analysis of a video conference attendee by, for example, one or more of the following names or identification: an attendee's computer userid, an attendee's name, date of the video conference, time of the video conference, subject of the video conference, video conference host, moderator name or other identification, and sentiments exhibited in the video conference. While depicted on server 120 in the exemplary embodiment, analysis database 165 may be on a remote server or a "cloud" of computers interconnected by one or more networks utilizing clustered computers and components to act as a single pool of seamless resources, accessible to sentiment analysis program 160 via network 110.

In the exemplary embodiment, computer 130 is a client to server 120. Computer 130 includes user interface (UI), UI 135 and video application 131 providing a user of computer 130 the capability to record, receive and view video. Computer 130 is capable of recording, sending, receiving and displaying data including video from video conference controller 122. In an exemplary embodiment, computer 130 is a smart phone. In other embodiments, computer 130 may be, for example, a notebook, a laptop, a personal digital assistant (PDA), a tablet, a desktop computer, a wearable computing device or any other computing system connected via network 110 to server 120 and capable of sending, receiving and displaying data on a user interface, including video from video conference controller 122. Computer 130 may be capable of either recording video of the attendee or receiving video of the attendee recorded by an external recording device, for example, a video camera. Computer 130 receives video via network 110 from video conference controller 122 on server 120 and displays video of the video conference on a user interface (UI), for example, UI 135.

In the exemplary embodiment, UI 135 may receive user input and display video received from video conference controller 122 of the other attendees in the video conference or data presented in the video conference. In an embodiment, computer 130 receives and displays on UI 135 sentiment analysis of the other video conference attendees and/or a real-time aggregated sentiment representing a group sentiment for all the video conference attendees. Both the individual sentiment of the other attendees and the aggregate sentiment of all of the attendees in the video conference may be displayed on UI 135 as a graphical representation of sentiment, for example, as shown in FIG. 3.

In one embodiment, computer 130 may not be a client device to server 120 but, may be directly connected via network 110 with one or more computing devices such as smart phones, laptops, wearable computing devices or notebooks which have video conference applications and video capability. In one embodiment, computer 130 may include sentiment analysis program 160.

Figure 2:
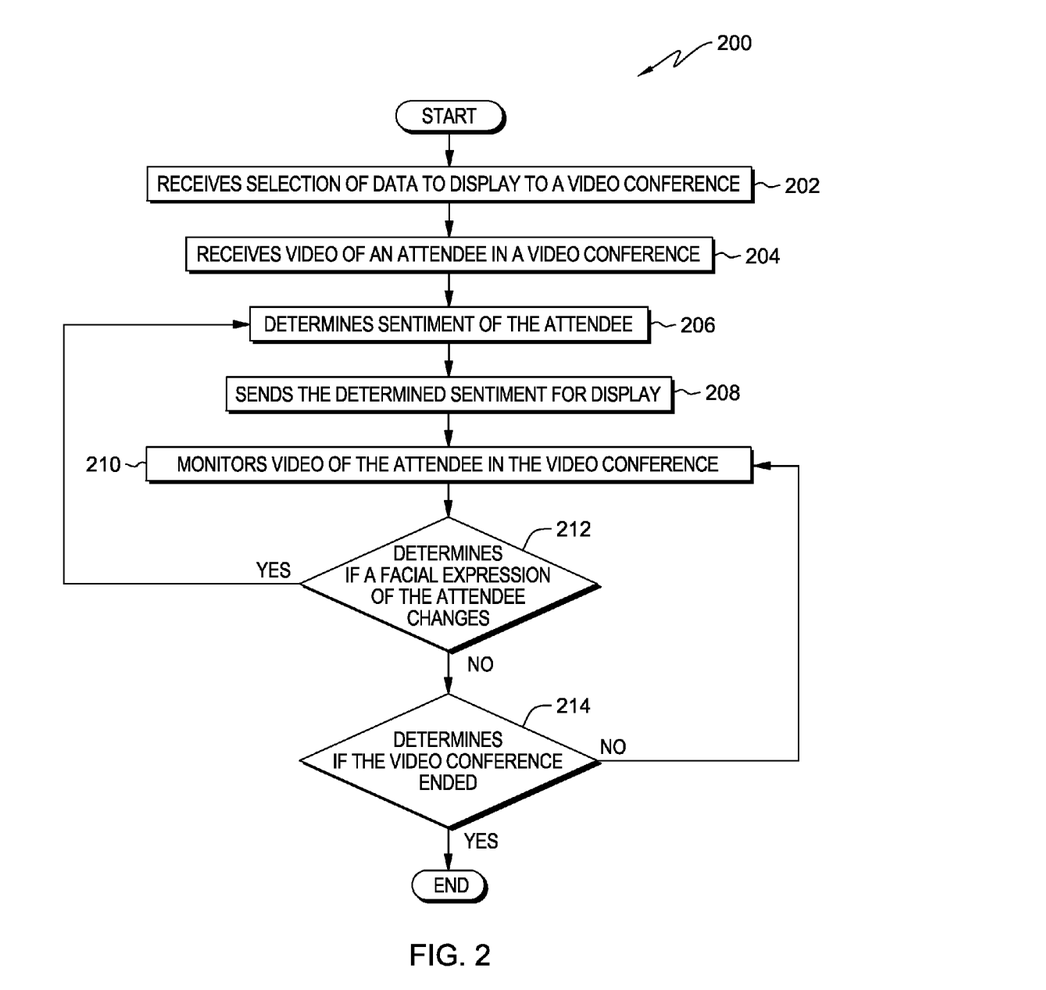
FIG. 2 is a flowchart depicting operational steps of a sentiment analysis program for video conferencing, on a computer within the data processing environment of FIG. 1, in accordance with an embodiment of the present invention.

FIG. 2 is a flowchart 200 depicting operational steps of sentiment analysis program 160 for video conferencing, in accordance with an embodiment of the present invention.

In step 202, sentiment analysis program 160 receives a selection of data to display in a video conference. The data to display may include a selection of data made by an attendee of the video conference, for example, an option for video only, video and sentiment, or to display sentiment only in the video conference. The selection of data may include displaying video to a moderator of the video conference only, to the moderator and other attendees, or to the moderator and others associated with the moderator. In one embodiment, the selection of data to display is configured or set-up as a default setting for the attendee who may select to send both video and sentiment for all video conferences, for example. In the exemplary embodiment, sentiment analysis program 160 performs sentiment analysis of the attendee irrespective of the attendee's selection for display to the moderator but, not to other video conference attendees. In this embodiment, only the moderator may view the attendee's sentiment or a real-time aggregate sentiment of all of the video conference attendees. In various embodiments, a moderator viewing the video conference and results from sentiment analysis program 160 on moderator display 125 may include a moderator, one or more other identified presenters, or one or more reviewers of the video conference or the sentiment analysis results.

In step 204 sentiment analysis program 160 receives video of an attendee in a video conference. In the exemplary embodiment, sentiment analysis program 160 receives video recorded by computer 130. In another embodiment, sentiment analysis program 160 may receive video from an external recording device via network 110, such as a video camera connected to computer 130. In an embodiment, sentiment analysis program 160 receives only audio feed of the attendee from a cell phone or desktop computer, for example. In the exemplary embodiment, sentiment analysis program 160 receives real-time or near real-time video of the attendee in a video conference. In one embodiment, sentiment analysis program 160 receives video of the attendee watching a pre-recorded meeting such as a class or lecture.

In step 206, sentiment analysis program 160 determines a sentiment of the attendee. In an exemplary embodiment, sentiment analysis program 160 determines the sentiment using one or more facial recognition techniques or methods. Sentiment analysis program 160 analyzes the video feed of the attendee in the video conference, for example, the attendee's facial expression and facial movements, to determine the attendee's sentiment or reaction to presented material and discussions in the video conference. A sentiment is a reaction, an opinion, a feeling or an attitude toward an event or a view of an event, such as an opinion prompted by a feeling. Sentiment analysis program 160 may access analysis database 165 to retrieve known facial expressions and facial movements associated with each sentiment (e.g. happiness, frustration, confusion, attention, boredom, neutrality, anger, laughter or polarity such as positive reaction and negative reaction) for use in the sentiment analysis. For example, applying facial recognition algorithms to video of an attendee who may have a slight frown or knit eyebrows may match a facial expression correlating to a sentiment such as confusion, stored in analysis database 165. The sentiments used by sentiment analysis program 160 may include a level or range of a sentiment, for example very positive or just slightly positive. In another embodiment, sentiment analysis program 160 may retrieve information correlating facial expressions or movements with sentiments via network 110.

In one embodiment, analysis database 165 receives pre-recorded videos of the attendee exhibiting various emotions. The pre-recorded videos capture the attendee exhibiting various moods, reactions or sentiments and may be used for comparison to video feed of the attendee from a video conference for sentiment analysis using facial recognition.

In the exemplary embodiment, sentiment analysis program 160 has the capability to learn characteristic expressions of the attendee in video conferences. Sentiment analysis program 160 can then improve sentiment analysis for an individual attendee. Sentiment analysis program 160 can use knowledge based learning programming to learn the attendee's characteristic expressions to more accurately determine sentiment of the characteristic expressions. Sentiment analysis program 160 may on each use or periodically, retrieve from analysis database 165 previously conducted sentiment analyses to determine characteristic expressions of an attendee based on historical sentiment analysis data and analyze previous sentiment analyses to refine and improve sentiment analysis for the attendee. For example, an attendee may characteristically exhibit a knit brow. Normally, a sentiment analysis of an attendee with a knit brow may indicate sentiment such as slight confusion. However, sentiment analysis program 160 can determine, based on a review of stored, historical sentiment analysis of the attendee that for this attendee exhibiting a knit brow is a characteristic expression and indicates a neutral sentiment. The knit brow, in this example, is a characteristic facial expression which may not equate with confusion but, instead may be a result of a vision challenge that causes the attendee to squint or knit his brow.

Sentiment analysis program 160 analyzes the attendee's facial expressions and facial movements looking at both an individual facial feature and a totality of the facial features for an expression on the face. Using facial recognition techniques, sentiment analysis program 160 compares the individual facial features and expressions on the face of the attendee in the video conference to similar facial features and facial expressions for known sentiment expressions to determine or match a corresponding sentiment. Using facial recognition techniques on the real-time video of the attendee, sentiment analysis program 160 determines a sentiment of the attendee from the real-time video transmitted to server 120 by computer 130 via network 110.

In various embodiments of the present invention, sentiment analysis program 160 determines sentiment using natural language processing and sentiment analysis when an attendee speaks in the video conference. Using NLP and sentiment analysis of the attendee's verbal comments in a video conference discussion, sentiment analysis program 160 can refine or augment the sentiment analysis of the attendee determined by facial recognition techniques or methods using real-time video of the attendee. When an attendee in a video conference speaks in the video conference, sentiment analysis program 160 can perform NLP and sentiment analysis of his or her spoken words to determine the attendee's sentiment based on the words the attendee uses in the video conference discussions. NLP with sentiment analysis may be used to understand the context in which the attendee's facial expression is exhibited to help determine or infer a more appropriate sentiment for the attendee. In embodiments of the present invention where the attendee does not have access to video recording, NLP and sentiment analysis of the attendee's comments and words spoken during meeting discussions may be used in place of the video feed of the attendee and displayed on moderator display 125.

When both facial recognition and NLP sentiment analysis methods are used, sentiment analysis program 160 may show both of the determined sentiments. In an embodiment, sentiment analysis program 160 may display to a moderator both sentiments using, for example, different icons (e.g. triangles and circles), or a color code such as black for sentiment determined by facial recognition and green for sentiment analysis using NLP and the attendee's spoken words.

In another embodiment, when both facial recognition and NLP sentiment analysis methods are used, sentiment analysis program 160 may combine the sentiments determined by facial recognition and by NLP and sentiment analysis when the sentiments are determined as a polarity of sentiments, for example, satisfied to dissatisfied. For example, sentiment analysis program 160 may select a sentiment that is between the two sentiments or a midpoint between two sentiments. For example, if a sentiment analysis of an attendee's verbal comments may determine that the attendee is mildly dissatisfied but, a sentiment analysis utilizing facial recognition and the attendee's facial expression in the video feed determines that the attendee is very dissatisfied, sentiment analysis program 160 determines that the attendee is dissatisfied, a sentiment midway between mildly dissatisfied and very dissatisfied.

In an embodiment, when a sentiment determined based on sentiment analysis of the attendee's spoken word is in conflict or significantly differs from a sentiment determined based on the attendee's facial expression, sentiment analysis program 160 may indicate both sentiments in a caution color, such as yellow or a flash, indicating a conflict in visual or facial sentiment analysis and verbal or NLP sentiment analysis of the attendee in the video conference.

Sentiment analysis program 160 may utilize knowledge based learning with sentiment analysis of the attendee's spoken word and incorporate learning from both verbal and facial recognition sentiment analysis to improve or more accurately determine the attendee's sentiment in a video conference. Sentiment analysis program 160 is capable of determining an attendee's characteristic facial expressions over time by retrieving and analyzing historical sentiment data with facial expressions and historical determinations of the attendee's sentiment based, in part, on the video of the attendee's facial expression from previously performed sentiment analysis to learn an attendee's common or characteristic expressions to refine and improve sentiment analysis for the attendee. The attendee's characteristic facial expressions as determined by analyzing and comparing previously performed sentiment analysis which may include video of the attendee from previous video conferences may be included in analysis database 165 for use in future sentiment analysis. The characteristic facial expressions of the attendee may be used to refine sentiment analysis of the attendee in future video conferences.

In step 208, sentiment analysis program 160 sends the determined sentiment for display. In an embodiment, sentiment analysis program 160 sends the determined sentiment of the attendee to a video conference system or web conference system, such as video conference controller 122, for display on moderator display 125. The attendee's sentiment may be displayed in any of several ways. In the exemplary embodiment, a graphical representation of the sentiment which may be, for example, a color coded bar with a slider indicating attendee's real-time sentiment is sent and displayed on moderator display 125. FIG. 3, discussed later, illustrates an example of a graphical representation of the attendee's real-time sentiment in a video conference. The visualization or color coded bar may show a range of sentiments from dissatisfied or negatively engaged at one end of the bar to very satisfied or positively engaged at the other end of the bar and an indicator such as a slider, arrow, or circle indicates the real-time sentiment of the attendee. The middle of the bar may indicate a number sentiments exhibited by the attendee. A key or table may be provided to show the sentiments by color. In other embodiments, other graphical representations or visualizations such as pie charts, scatter diagrams, bar charts or words such as active listening, bored, engaged (e.g. a slight smile) or slightly confused may be displayed to display or show an attendee's sentiment in a video conference. In another embodiment, rather than a color bar to indicate a range of sentiment, an attendee's sentiment may be ranked, for example, on a scale of 1 to 10.

In an embodiment, sentiment analysis program 160 may include a real-time graphical representation of each of the attendee's sentiments in a video conference. In another embodiment, sentiment analysis program 160 may include a real-time aggregate sentiment averaged or compiled for all of the video conference meeting attendees using sentiment analysis. In one embodiment, sentiment analysis program 160 may send sentiment data for display on moderator display 125 which includes a graphical representation of each attendee's real-time sentiment and the real-time aggregated sentiment for all of the video conference attendees.

In step 210, sentiment analysis program 160 monitors video of the attendee in the video conference. Sentiment analysis program 160 monitors the real-time video feed of the attendee in the video conference for changes in pose, facial expressions, facial movements or verbal articulations.

In step 212, sentiment analysis program 160 determines if a facial expression of the attendee changes. Sentiment analysis program 160 monitors the real-time video of the attendee and using facial recognition algorithms, determines if the attendee changes a facial expression in the real-time video feed. A change in facial expression may include a change in a facial feature or a movement of a facial feature, such as when the attendee is speaking. When sentiment analysis program 160 determines that there is a change in the facial expression of the attendee ("yes" branch, decision block 212), the program returns to step 206 to determine sentiment of the attendee and update the display to the moderator on moderator display 125.

If sentiment analysis program 160 determines there is no change in the facial expression of the attendee ("no" branch, decision block 214), then the program, in step 214, determines if the video conference has ended. If sentiment analysis program determines the video conference ended ("yes" branch, decision block 214), then sentiment analysis program 160 ends processing. In various embodiments, sentiment analysis program 160 can determine the video conference has ended when the program no longer receives any of video conference feeds from video conference controller 122, when other video conference attendees indicate the end of the video conference, or when the attendee elects to exit the program by clicking on an icon or tab such as "end" or "close program". If sentiment analysis program 160 determines that the video conference has not ended ("no" branch, decision block 214), then sentiment analysis program 160 returns to step 210 and continues monitoring the video of the attendee.

FIG. 3 is a diagram, generally designated 300, illustrating an example of a moderator display depicting a graphical representation of attendee's sentiment in a video conference. Diagram 300 depicts moderator display 310, which includes a box 320 for each attendee, each box 320 including a sentiment bar 321 which may be a color coded sentiment bar. The sentiment bar 321 indicates a range of sentiment from very dissatisfied to very satisfied as shown on the sentiment table 360. Slider 322 indicates the real-time sentiment of the attendee in the video conference using the range of sentiments depicted in sentiment table 360. Aggregate sentiment bar 330 is illustrated with slider 322 indicating the real-time aggregate sentiment for all of the attendees in the video conference. Aggregate sentiment bar 330 uses the sentiments depicted in sentiment table 360.

Figure 4:
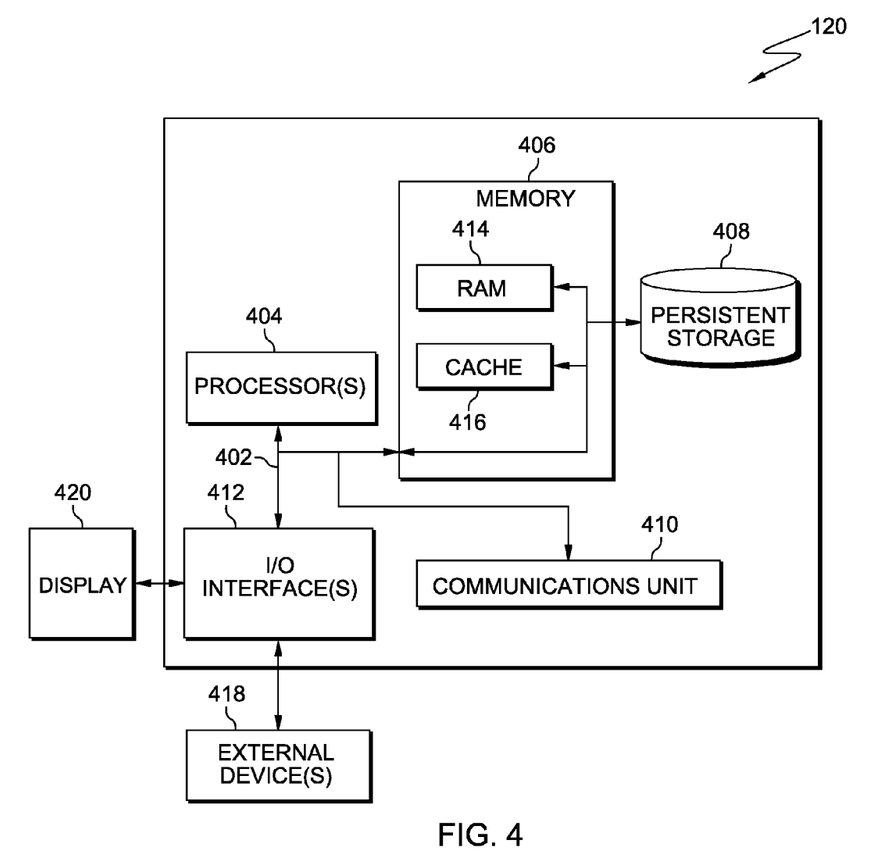
FIG. 4 depicts a block diagram of components of the server computer executing the sentiment analysis program, in accordance with an embodiment of the present invention.

FIG. 4 depicts a block diagram of components of server 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Sentiment analysis program 160 and analysis database 165 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of enterprise grid 100, moderator display 125 and computer 130. In these examples, communications unit 410 includes one or more network interface cards. Communications unit 410 may provide communications through the use of either or both physical and wireless communications links. Sentiment analysis program 160 and analysis database 165 may be downloaded to persistent storage 408 through communications unit 410.

I/O interface(s) 412 allows for input and output of data with other devices that may be connected to server computer 102. For example, I/O interface 412 may provide a connection to external device(s) 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, sentiment analysis program 160 and analysis database 165, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a sentiment of an attendee of a video conference, the method comprising:
   receiving, by one or more computing devices, a video of an attendee of a video conference;
   determining, by one or more computing devices, based, at least in part, on the video of the attendee, a first sentiment of the attendee wherein the first sentiment includes at least a sentiment from a sentiment analysis of one or more facial expressions of the attendee and a sentiment from a sentiment analysis of a plurality of the attendee's spoken words;
   determining, by the one or more computing devices, that the sentiment from the sentiment analysis of the one or more facial expressions of the attendee and the sentiment from the sentiment analysis of the plurality of the attendee's spoken words are different; and
   responsive to determining that the sentiment from the sentiment analysis of the one or more facial expressions of the attendee and the sentiment from the sentiment analysis of the plurality of the attendee's spoken words are different, indicating, by one or more computing devices, that the sentiment from the sentiment analysis of the one or more facial expressions of the attendee and the sentiment from the sentiment analysis of the plurality of the attendee's spoken words are different.

2. The method of claim 1 further comprising, displaying, by one or more computing devices, the first sentiment of the attendee in the video conference.

3. The method of claim 1, wherein determining, by one or more computing devices, based, at least in part, on the video of the attendee, the first sentiment of the attendee further comprises using at least one of a facial recognition technique, a natural language processing technique, and a sentiment analysis technique.

4. The method of claim 1 wherein, determining, by one or more computing devices, based, at least in part, on the video of the attendee, a first sentiment of the attendee, further comprises:
compiling, by one or more computing devices, a first sentiment of a plurality of attendees of the video conference to determine a first aggregate sentiment of the plurality of attendees for the video conference, and
displaying, by one or more computing devices, the first aggregated sentiment in the video conference.

5. The method of claim 1, further comprising:
monitoring, by one or more computing devices, the video of the attendee;
determining, by one or more computer devices, whether the first sentiment of the attendee has changed; and
responsive to determining the first sentiment of the attendee has changed, determining, by one or more computing devices, a second sentiment of the attendee.

6. The method of claim 1, wherein determining, by one or more computing devices, the first sentiment of the attendee further comprises:
retrieving, by one or more computing devices, historical sentiment data of the attendee;
determining, by one or more computing devices, based, at least in part, on the historical sentiment data of the attendee, one or more characteristic facial expressions of the attendee;
comparing, by one or more computing devices, the one or more characteristic facial expressions with the video of the attendee; and
determining, by one or more computing devices, a second sentiment, based, at least in part, on the one or more characteristic facial expressions and the video of the attendee.

7. The method of claim 1, wherein receiving, by one or more computing devices, a video of an attendee of a video conference further comprises:
receiving, by one or more computing devices, a selection of data to display in the video conference wherein the selection of data includes at least one of a video only, a video and a sentiment, or a sentiment only.

8. The method of claim 1, wherein receiving a video of an attendee of a video conference further comprises;
receiving, by one or more computing devices, from the attendee an identification of one of a moderator or the moderator and a plurality of attendees associated with the video conference to display a specified selection of a video of the attendee, a sentiment of the attendee, or a video and a sentiment of the attendee in the video conference.

9. A computer program product for determining a sentiment of an attendee of a video conference, the computer program product comprising:
one or more computer readable storage media and program instructions stored on the one or more computer readable storage media, the program instructions executable by a processor, the program instructions comprising:
program instructions to receive a video of an attendee of a video conference; and
program instructions to determine, based, at least in part, on the video of the attendee, a first sentiment of the attendee wherein the first sentiment includes a sentiment from a sentiment analysis of one or more facial expressions of the attendee and a sentiment from a sentiment analysis of a plurality of the attendee's spoken words;
program instructions to determine that the sentiment from the sentiment analysis of the one or more facial expressions of the attendee and the sentiment from the sentiment analysis of the plurality of the attendee's spoken words are different; and
responsive to determining that the sentiment from the sentiment analysis of the one or more facial expressions of the attendee and the sentiment from the sentiment analysis of the plurality of the attendee's spoken words are different, program instructions to indicate that the sentiment from the sentiment analysis of the one or more facial expressions of the attendee and the sentiment from the sentiment analysis of the plurality of the attendee's spoken words are different.

10. The computer program product of claim 9, further comprising program instructions to display the first sentiment of the attendee in the video conference.

11. The computer program product of claim 9, wherein the program instructions to determine, based, at least in part, on the video of the attendee, the first sentiment of the attendee further comprises using at least one of a facial recognition technique, a natural language processing technique, and a sentiment analysis technique.

12. The computer program product of claim 9, wherein the program instructions to determine, based, at least in part, on the video of the attendee, a first sentiment of the attendee, further comprises:
program instructions to compile a first sentiment of a plurality of attendees of the video conference to determine a first aggregate sentiment of the plurality of attendees for the video conference, and
program instructions to display the first aggregated sentiment in the video conference.

13. The computer program product of claim 9, further comprising:
program instructions to monitor the video of the attendee;
program instructions to determine whether the first sentiment of the attendee has changed; and
responsive to determining the first sentiment of the attendee has changed, program instructions to determine a second sentiment of the attendee.

14. The computer program product of claim 9, wherein the program instructions to determine the first sentiment of the attendee further comprises:
program instructions to retrieve historical sentiment data of the attendee;
program instructions to determine, at least in part, on the historical sentiment data of the attendee, one or more characteristic facial expressions of the attendee;
program instructions to compare the one or more characteristic facial expressions with the video of the attendee; and
program instructions to determine a second sentiment, based, at least in part, on the one or more characteristic facial expressions and the video of the attendee.

15. The computer program product of claim 9, wherein the program instructions to receive a video of an attendee of a video conference further comprises:
program instructions to receive a selection of data to display in the video conference wherein the selection of data includes at least one of a video only, a video and a sentiment, or a sentiment only.

16. A computer system for determining a sentiment of an attendee of a video conference, the computer system comprising:
one or more computer processors;
one or more computer readable storage media;
program instructions stored on the one or more computer readable storage media for execution by at least one of the one or more processors, the program instructions comprising:
program instructions to receive a video of an attendee of a video conference;
program instructions to determine, based, at least in part, on the video of the attendee, a first sentiment of the attendee wherein the first sentiment includes a sentiment from a sentiment analysis of one or more facial expressions of the attendee and a sentiment from a sentiment analysis of plurality of the attendee's spoken words;
program instructions to determine that the sentiment from the sentiment analysis of the one or more facial expressions of the attendee and the sentiment from the sentiment analysis of the plurality of the attendee's spoken words are different; and
responsive to determining that the sentiment from the sentiment analysis of the one or more facial expressions of the attendee and the sentiment from the sentiment analysis of the plurality of the attendee's spoken words are different, program instructions to indicate that the sentiment from the sentiment analysis of the one or more facial expressions of the attendee and the sentiment from the sentiment analysis of the plurality of the attendee's spoken words are different.

17. The computer system of claim 16, wherein the program instructions to determine, based, at least in part, on the video of the attendee, the first sentiment of the attendee further comprises using at least one of a facial recognition technique, a natural language processing technique, and a sentiment analysis technique.

18. The computer system of claim 16, further comprising:
program instructions to monitor the video of the attendee;
program instructions to determine whether the first sentiment of the attendee has changed; and
responsive to determining the first sentiment of the attendee has changed, program instructions to determine a second sentiment of the attendee.

19. The computer system of claim 16, wherein the program instructions to determine the first sentiment of the attendee further comprises:
program instructions to retrieve historical sentiment data of the attendee;
program instructions to determine, at least in part, on the historical sentiment data of the attendee, one or more characteristic facial expressions of the attendee;
program instructions to compare the one or more characteristic facial expressions with the video of the attendee; and
program instructions to determine a second sentiment, based, at least in part, on the one or more characteristic facial expressions and the video of the attendee.

20. The computer system of claim 16, wherein the program instructions to receive a video of an attendee of a video conference further comprises:
program instructions to receive a selection of data to display in the video conference wherein the selection of data includes at least one of a video only, a video and a sentiment, or a sentiment only.

* * * * *